(12) United States Patent
Tjen

(10) Patent No.: US 7,856,922 B2
(45) Date of Patent: Dec. 28, 2010

(54) INSTANT EXTRACTION CUP

(76) Inventor: Eddy Tjen, Elang Laut 11/3 Rt. 004 Rw. 003, Kamal Muara-Penjaringan, Jakarta Utara (ID)

( * ) Notice: Subject to any disclaimer, the term of this patent is extended or adjusted under 35 U.S.C. 154(b) by 314 days.

(21) Appl. No.: 11/947,901

(22) Filed: Nov. 30, 2007

(65) Prior Publication Data

US 2008/0264268 A1   Oct. 30, 2008

Related U.S. Application Data

(60) Provisional application No. 60/926,393, filed on Apr. 25, 2007.

(51) Int. Cl.
*A47J 31/00* (2006.01)

(52) U.S. Cl. ............................. 99/322; 99/321; 99/323; 426/77; 426/82

(58) Field of Classification Search .................. 99/322, 99/323, 321, 319; 426/77, 80, 115; *A47J 31/02, A47J 31/06, 31/44, 31/00*
See application file for complete search history.

(56) References Cited

U.S. PATENT DOCUMENTS

| | | | | |
|---|---|---|---|---|
| 2,329,608 A | * | 9/1943 | Graham et al. | 99/283 |
| 2,607,338 A | * | 8/1952 | Parenti | 126/385.1 |
| 2,885,290 A | * | 5/1959 | Krasker | 99/306 |
| 3,252,403 A | * | 5/1966 | Polizzi | 99/312 |
| 3,270,658 A | * | 9/1966 | Tavera | 99/295 |
| 3,985,069 A | * | 10/1976 | Cavalluzzi | 99/295 |
| 4,069,751 A | * | 1/1978 | Gronwick et al. | 99/306 |
| 4,158,329 A | * | 6/1979 | McKnight | 99/295 |
| 4,174,659 A | * | 11/1979 | Pugliese et al. | 99/306 |
| 4,446,158 A | * | 5/1984 | English et al. | 426/79 |
| 4,520,716 A | * | 6/1985 | Hayes | 99/306 |
| 4,577,080 A | * | 3/1986 | Grossman | 219/689 |
| 4,739,697 A | * | 4/1988 | Roberts | 99/295 |

(Continued)

FOREIGN PATENT DOCUMENTS

JP    2001275842   * 10/2001

*Primary Examiner*—Reginald L Alexander
(74) *Attorney, Agent, or Firm*—Cantor Colburn LLP

(57) ABSTRACT

A beverage brewer, adapted to discharge fresh extractable ingredients to a liquid receiving container there below including a brewing cup having an open top and having a liquid pervious bottom, adapted for holding a quantity of an infusible material for a certain time limit to allow a stirring action before dispensing the brewed beverage there from into the liquid receiving container, at least one sheet of filter element sealed along a perimeter of a bottom base of the brewing cup by a non-toxic meltable substance and thereby sealed unto the bottom base of the brewing cup, a plurality of perforations formed in the bottom base of the brewing cup wherein each of the perforations has an area of at least about 25 millimeters square and where the perforations are separated from each other by at least about 2 millimeters, at least one concave shape vent disposed on a lower part of an outer wall of the brewing cup and configured to allow escape of steam from the liquid receiving container during brewing, and a sit-on-ring configured to support the brewing cup on the liquid receiving container, the sit-on-ring including a tapered frustoconical shaped ring, and a plurality of supporting legs extending generally radially from the annular shaped ring, the legs each including at least one ridge feature configured to receive a rim of the liquid receiving container and to removably fix the sit-on-ring to the liquid receiving container.

19 Claims, 5 Drawing Sheets

U.S. PATENT DOCUMENTS

| | | | |
|---|---|---|---|
| 4,867,880 A * | 9/1989 | Pelle et al. | 210/474 |
| 4,908,222 A * | 3/1990 | Yu | 426/241 |
| 5,010,221 A * | 4/1991 | Grossman et al. | 219/689 |
| 5,036,755 A * | 8/1991 | Abdenour | 99/306 |
| 5,064,980 A * | 11/1991 | Grossman et al. | 219/689 |
| 5,243,164 A * | 9/1993 | Erickson et al. | 219/689 |
| 5,632,194 A * | 5/1997 | Lin | 99/285 |
| 5,775,206 A * | 7/1998 | St-Gelais | 99/323 |
| 6,669,046 B1 * | 12/2003 | Sawada et al. | 220/270 |
| 6,889,599 B2 * | 5/2005 | Koslow | 99/306 |
| 6,964,223 B2 * | 11/2005 | O'Loughlin | 99/297 |
| 7,490,542 B2 * | 2/2009 | Macchi et al. | 99/295 |

* cited by examiner

INSTANT EXTRACTION CUP

CROSS-REFERENCE TO RELATED APPLICATION

This application claims the benefit of U.S. Provisional Application Ser. No. 60/926,393, filed on 25 Apr. 2007 entitled "INSTANT EXTRACTION CUP," which is incorporated herein by reference in its entirety.

BACKGROUND OF THE INVENTION

1. Field of the Invention

The invention relates to disposable hot beverage brewing apparatuses, such as for coffee, tea and herbal products. More particularly, the invention relates to hot beverage disposable containers that contain filter papers that trap solids within the container yet enable fluid to pass. The liquid penetrability is defined by the cup's holes/cutting areas that allow the liquid to penetrate into a lower reservoir cup at a consumer's time limit preferences. The arrangement of how many holes or how big the cutting area will result in how long the extraction should take place (e.g. 2 minutes; 3.5 minutes; or 5 minutes).

Ultimately, this invention has been designed to provide a proper time and space to provide a stirring movement in a prepackaged 3-in-1 (i.e., coffee, sugar and powder creamer) coffee mix product that comes in a small sachet for one serving. The time and space to properly stir is critical in a 3-in-1 coffee mix preparation. Without stirring, the powder creamer that has been homogenously mixed with sugar and coffee, when in contact with hot water will form a fat layer (aka, shield effect) that prevents the hot water hard from penetrating into the rest of the mixture. As such, the 3-in-1 coffee mix will become clogged and will form a glutinous like compound which makes the extraction process improperly done. Thus, to have a brewing apparatus that allows proper stirring is important especially in a prepackaged beverage mixture that contains powder creamer as one of its major ingredients.

2. Description of Related Art

Coffee has been consumed and is known as the oldest beverage in many parts of the world. Thus, there are various devices that have been used to brew coffee. Traditionally, coffee grounds have been brewed in a coffee pot (infusion). Later on, people preferred to brew in electric drip coffee machine due to its conveniences. Moreover, due to the advance of spray-dried technology, instant coffee also has been a choice to many people. These are fair methods to enjoy a cup of coffee; however each one of them has their own drawbacks due to timing, mobility and the fullness of the taste and aroma.

In a percolator/coffee pot, a small amount of coffee grounds is repeatedly boiled to move liquid over the grounds which often gives a burnt taste and tends to also over extract the beverage. In short, percolation can contribute bitterness and astringency to the final result. Electric drip coffee machines have won the heart most average households throughout the world. However popular, such machines are not portable nor mobile enough to be used outside the house. People such as average office workers (that don't have their own coffee maker or a person that prefers a different blend from that provided), dormitory students, and long distance commuters often do not find electric drip coffee machines to be advantageous. Instant coffee is the fastest method amongst the previously mentioned methods to prepare a cup of coffee. However, the major drawback for instant coffee is that it is more expensive to make. Generally, only 1 kg of instant coffee is derived from 2 kg-2.6 kg of coffee beans. Also, many people still believe that instant coffee (processed coffee) has inferior quality in its flavoring in comparison to the natural fresh ground coffee. As such, flavor and sophistication are sacrificed for convenience.

Many brewing apparatuses for tea, coffee and herbal drink have been developed. One such apparatus (U.S. Pat. No. 6,263,781) consists of a cup receptacle with filter element that is configured to engage the ridge of an interior of the cup receptacle. This apparatus does separate the indigestible coffee ground during brewing process. However, it passes water and extracts very fast when one pours hot water into it. The apparatus cannot hold the hot water, which is required to be properly in contact with the coffee ground, for any certain amount of time. As a result the coffee beverage will definitely taste weak (i.e., under extracted). The inability to hold the hot water with a pre-mix of coffee ground, creamer and sugar even for a brief moment, also renders stirring the beverage impossible. Thus, a prepackaged 3-in-1 coffee mix is not suitable when using this apparatus. On the other hand, in order to achieve a better tasting coffee beverage, one would have to exert great patience in only pouring hot water into the apparatus repeatedly in small quantities. By standing near the brewing apparatus and repeatedly pouring small amounts of hot water during a process that could last more than 10 minutes, it is hardly a perfect or efficient way to get a decent cup of coffee beverage. Furthermore, in this configuration, the coffee grounds are placed into the cup along with the hot water for extraction. The beverage is then consumed directly from the cup, the filter element maintaining the coffee grounds within the cup and preventing consumption thereof. However, maintaining the coffee grounds within the cup will result in over extraction and spoil the coffee taste and aroma. The correct extraction process requires not more than the recommended time (4 to 8 minutes depending on the coffee ground coarseness). When it takes too long, as in the case of the '781 patent, more unfavorable ingredients that will cause bitterness to the taste and some astringent smell that spoil the coffee aroma will get extracted, thus degraded the coffee beverage.

Releasing hot steam heat trapped during the brewing process is a crucial step. It is especially important when the receptacle employs a telescoping assembly that sits on the reservoir cup. Such assembly creates a firm mount on the brewer cup but, on the other hand, it leaves no escape route for the hot steam created from the pouring of near-boiling hot water. The trapped heat will accumulate beneath the assembly and form resistant forces in pushing the heat up, thus, slowing or interfering the beverage dripping process generated by gravity forces. In moderate condition, it slows the beverage dripping process but it can even immobilize the process in an extreme condition depending upon the degree of the hot water being used and material used in filtering. One of such apparatus that does not have a hot steam releasing vent for the mounted beverage brewer is disclosed in U.S. Pat. No. 4,520,716.

Many brewing devices have failed to accommodate pre mix or prepackaged beverages such as 3-in-1 coffee mix and 3-in-1 tea mix. It is because many of the brewing devices have been ignoring the critical need of stirring, during preparation, of such product containing powder creamer as one of its major ingredients. One brewing method that uses a filter paper pouch or bag is disclosed in U.S. Pat. No. 5,478,581. This is an example of how difficult, if not impossible, it is to get the 3-in-1 coffee mix or tea mixture (presumably contained in the pouch) thoroughly diluted and extracted. This is due to the fat from the powder creamer creating a shield effect that prevents the hot water from further penetrating into the rest of the mixture. A product in this category can be categorized as a closed-brewing system. In this system, the user is not allowed to perform any kind of modification on the product. This system offers no flexibility to the user either to add or to reduce, for instance, the quantity of the coffee grounds into the pouch/bag.

U.S. Pat. No. 4,619,830 discloses a brewing apparatus that employed an open-brewing-system that offers a user more flexibility either to add or to reduce, for instance, the quantity of the coffee ground, sugar or powder creamer into the beverage. However, a supporting stick/rod in the middle of a top opening has made it uneasy or troublesome for the user in performing a proper stirring motion during beverage preparation.

Each of the prior patents described, has shown one or more drawbacks which make them until now not a mass product or efficient method to brew "coffee to go". The invention improves upon the other deficiencies inherent in the prior art and yields an inexpensive, novel, disposable, flexible, mobile, easy to utilize, more accurate (based on brewing time recommendations from coffee experts) brewing apparatus for the public.

BRIEF SUMMARY OF THE INVENTION

Coffee, tea and herbal products are very sophisticated products. Each require a certain special treatment to get its utmost benefit. Since, all require hot water to extract the sophisticated ingredient contained therein, using a correct brewing apparatus is critical. This invention has been designed to give an accurate brewing time.

Habitually, a large number of coffee drinkers prefer to add sweetener and cream to their coffee beverage. For such drinkers, there has been a desire to avoid the necessity of separately adding sugar and creamer. For example, such persons would desire the convenience of a single serve prepackaged mixture containing "real" roasted ground coffee, sweetener and creamer, i.e., a 3-in1 prepackaged mixture. Unfortunately, previous attempts at products containing a mixture of coffee, creamer and sugar particles within filter elements have been disappointing.

Thus, there is a need for a compact, inexpensive, unitary and mobile apparatus with filtering element for accommodating such prepackaged beverage mixture for preparing an infusion beverage such as coffee, tea or the like. Such prepackaged mixture would be placed in the brewer cup along with hot water for a time sufficient to allow the coffee to brew. The need and necessity to measure each one of the pre mentioned ingredient then would be avoided.

The disclosure provides an apparatus that, based on written recommendation from Specialty Coffee Association of America, regulates "how long" coffee ground should be in contact with hot water in order to prepare an excellent cup of coffee beverage. The disclosure further provides an open system brewing apparatus that allows the user to have more flexibility to choose what kind of ingredients are brewed. The disclosure also provides a brewing apparatus that has a hot steam releasing vent and also that can be positioned snuggly on top of a regular coffee mug or disposable paper cup. Additionally, the invention provides a brewing apparatus that is easily stirable when brewing a 3-in-1 pre-packaged powder beverage that contains powder creamer as one of its major ingredients.

A cup container comprises a disposable liquid permeable brewing filter that has an open top and partial closed bottom. It is made of coated paper, or polyethylene, or polystyrene or biodegradable substances including but are not limited to substances such as modified and or unmodified organic fibers and or pulp and or starch, or any combination thereof that has number of holes or cutting areas on the bottom of the cup. The number of holes or cutting areas is the time control mechanism which plays a critical role in controlling the flow of the liquid from the brewing filter to the bottom of a reservoir cup or mug. Each hole represents about 28.26 millimeter square. Although this size is preferred to create generally raindrop size droplets, the hole/cutting area can be varied in size. Preferably, the perforation of the invention comprises an arrangement of about 16.9% (diameter of (ø) 15 mm) to 9.1% (ø 11 mm) by ratio to the brewer's cup bottom base (4183.3 mm$^2$); more preferably from about 7.5% (ø 10 mm) to 3.7% (ø 7 mm); more preferably still, from about 2.7% (ø 6 mm) to 0.68% (ø 3 mm).

Furthermore, in one alternative, the shape of the brewer's bottom base opening area can be modified into many kinds of shapes. Such modification to the bottom base of the brewer cup is desirable to enhance its aesthetic appearances include, but are not limited to, triangle, rectangle, oval, diamond, flower petal, star, circle, heart, crescent, fan, nonagon, octagon, pentagon, decagon, and hexagon, or any combination thereof.

The cup's bottom has been designed with four concave shapes that are inwardly curving which, in this embodiment, are used to release hot steam buildup during the brewing process. When disposed on a coffee mug these corners allow hot steam that is accumulated in the reservoir cup to escape. The vent is important to create a resistant-free environment of the liquid flow from top to bottom during brewing process. The number of petal shape corner can be maximized or minimized accordingly to the desired output of hot steam released (HSR) rate.

When telescopically positioned on a regular coffee mug, or similar, that has a top inner side opening range between 7.2 cm in diameter to 7.5 cm in diameter, the brewing cup will fit snuggly on the reservoir cup without any holder. For a mug that has an inner side top opening with diameter of 7.6 cm to 8 cm, the brewing cup utilizes an attachable thin polystyrene sheet on the bottom of the outer side of the cup which is positioned on the bottom. The number of thin polystyrene sheets can be varied according to the reservoir cup top opening width. Furthermore, for a bigger diameter mug such as a cappuccino mug that is larger than 8 cm, it uses a perfectly fit sit-on-ring which is rounded in shape and has three supporting jagged legs. All of the above mentioned designs are applied to hold the cup receptacle firmly with the reservoir cup and provided some fair mobility during brewing process.

The filter paper or other porous material attaches onto the bottom of the cup assembly through hot seal or food grade starch. The heat seal is applied about 5 mm width circling along the outer edge of the filter paper onto the cup's bottom. The 5 mm heat seal width provides some stretching flexibility to form a better pressure point during the beverage drip-down process. One alternative embodiment allows re-use of the cup assembly and throwing away of the used filter paper in order to preserve natural resources for a better clean environment. This can be achieved if the filter paper can be easily peeled off by the user. With the 5 mm heat seal width design, the user can peel the used filter paper more easily as it is only attached to a small number of areas on the cup's bottom base. The hot seal can be applied because the commercial filter paper contains Poly Ethylene (PE) on one of its sides. When applied to heat, the PE material melts and becomes part of the cup assembly.

A comparison has been made between a "multiple hole/cutting arrangement" and a "one single cut arrangement" in the below table 1.
Cup's Base Area: r=36.5 mm
3.14×36.5 mm×36.5 mm=4183.265 mm²
Hole Area: r=3 mm
3.14×3 mm×3 mm=28.26 mm²

Testing Procedure:

Two cups that have an exact size are being used in this test. One is with holes punctured in the bottom and the other has a closed bottom. The punctured cup will be used to measure the rate it reaches 120 ml on the measuring container, while the other cup as a measurement standard which hold 170 ml water. The cup has been pre-wetted with hot water by passing it through in order to get the filter paper ready to the testing process. The time was taken with a stopwatch when the water level reached 120 ml on the measuring container.

TABLE 1

Multiple Cutting Arrangement Vs. One Single Cutting Arrangement

| No. of Holes | Multiple holes/ cutting areas Arrangement | | Hot Water (HW) Reach 120 ml at 00:00:00 | One single cut with rectangular shape Arrangement | | Hot Water (HW) Reach 120 ml at 00:00:00 |
|---|---|---|---|---|---|---|
| | Sum. in mm 2 | Holes to Base Ratio % | | Sum. in mm 2 | Cutting to Base Ratio % | |
| 1 | 28.26 | 0.68% | | | | |
| 2 | 56.52 | 1.35% | | | | |
| 3 | 84.78 | 2.03% | | | | |
| 4 | 113.04 | 2.70% | 0:20:03 | 11 mm × 10.28 mm = 113.08 | 2.70% | 0:29:12 |
| 5 | 141.3 | 3.38% | | | | |
| 6 | 169.56 | 4.05% | | | | |
| 7 | 197.82 | 4.73% | | | | |
| 8 | 226.08 | 5.40% | 0:12:05 | 15 mm × 15.07 mm = 226.05 | 5.4% | 0:16:21 |
| 9 | 254.34 | 6.08% | | | | |
| 10 | 282.6 | 6.76% | | | | |
| 11 | 310.86 | 7.43% | | | | |
| 12 | 339.12 | 8.11% | 0:07:88 | 18 mm × 18.84 mm = 339.12 | 8.11% | 0:09:69 |
| 13 | 367.38 | 8.78% | | | | |
| 14 | 395.64 | 9.46% | | | | |
| 15 | 423.9 | 10.13% | | | | |
| 16 | 452.16 | 10.81% | 0:04:91 | 21 mm × 24.58 mm = 452.13 | 10.81% | 0:13:53 |
| 17 | 480.42 | 11.48% | | | | |
| 18 | 508.68 | 12.16% | | | | |
| 19 | 536.94 | 12.84% | | | | |
| 20 | 565.2 | 13.51% | 0:03:85 | 23 mm × 24.58 mm = 565.34 | 13.51% | 0:08:53 |

As can be seen in Table 1, the brewing receptacle with multiple holes arrangement has a more stable result than in the other arrangement. And also with the same ratio, multiple holes arrangement has proved to pass liquid faster than one single cut arrangement. It is because every cutting area has a pressure point on the middle of the open area. That is, when the filter paper gets wet from the hot water and is effected by gravity forces, the filter paper will stretch a little and arch in a way to form a pressure point where most of the liquid drips during brewing process. As concluded in our test, the greater the number of outlets, the faster the brewing receptacle will allow the liquid to pass through the filter paper into the reservoir cup/mug. The test also showed that one single cut arrangement, for example with 13.51% ratio, has a slower rate (8 second and 53 millisecond) in reaching the 120 ml marking level than 20 multiple cutting arrangements (3 second and 85 millisecond) also with the same ratio. The single cut arrangement has also proved to be less stable and unreliable as a time control mechanism.

The invention generally provides a disposable brewing apparatus made of inexpensive material such as coated paper board or polystyrene or polyethylene and filter paper. In one alternative, it can also be used to preserve natural resources where the filter paper is the only part of the entire assembly to be discarded after use.

DETAILED DESCRIPTION OF THE INVENTION

Figure 1:
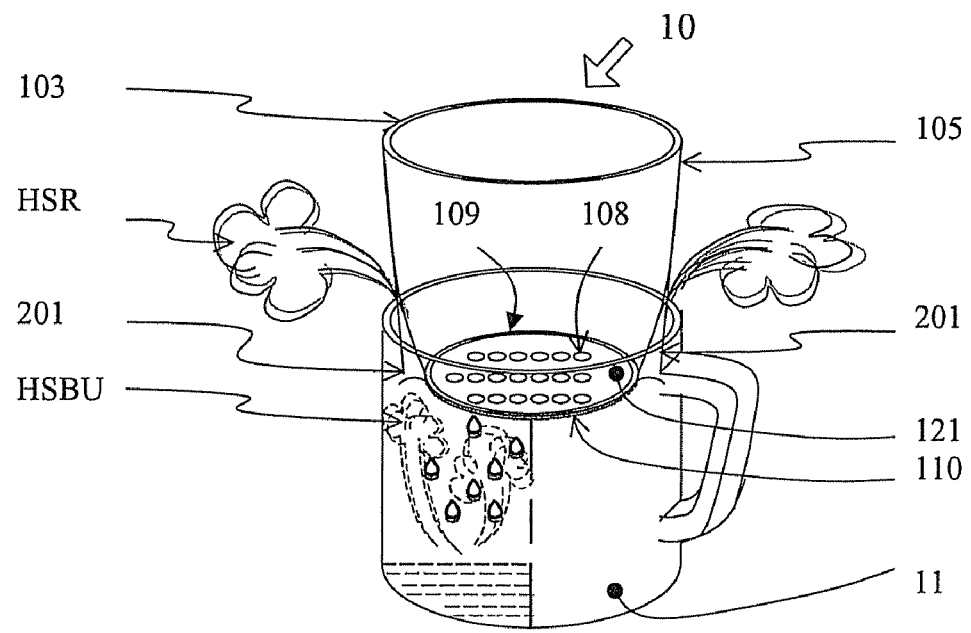
FIG. 1 is a perspective view of a coffee brewer positioned above a coffee mug.
Figure 2:
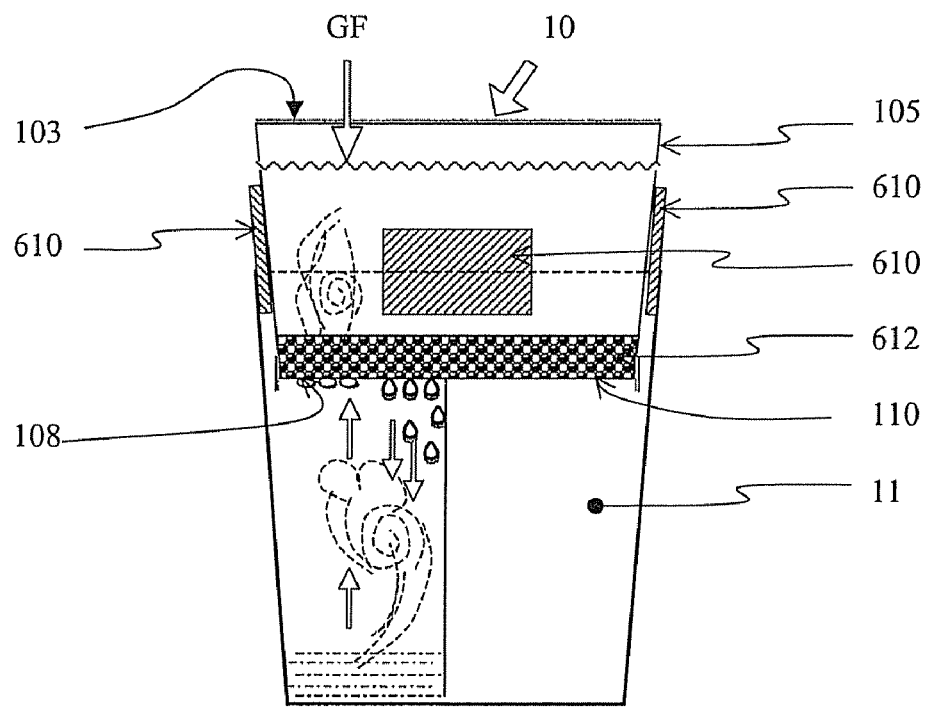
FIG. 2 is a vertical sectional view of the coffee brewer positioned above a disposable standard paper cup having an opening greater than the mug of FIG. 1.

As best seen in FIGS. 1 and 2, a drip-type coffee, or herbal or tea brewer apparatus comprises a disposable cup 10 which can be made from material including but not limited to polystyrene compounds, plastic, organic and or non organic Biodegradable polymer, and or modified and or unmodified organic fibers and or pulp and or starch and or coated paperboard and or a combination thereof. Referring to the cup 10, it includes a partial closed bottom 110 that has an outer diameter of about 7.3 cm and sidewalls 105 tapering outwardly towards a top open mouth 103 that has an outer diameter of about 8.5 cm. The filter cup 10 is constructed of a water permeable or porous material which has substantial durability when in a wet condition, and which is coated with Polyethylene on one side and comparatively inexpensive so that it may be discarded after a single use. The filter paper 121 is attached to the bottom base 110 of the filter cup 10 through heat seal or food grade starch or ultrasonic sealing system or supersonic sealing system. The filter cup 10 is designed with a plurality number of holes 108 on the bottom base 110 as a time control mechanism which is fundamental to brew different kinds of ingredients as each ingredient often has different time requirements in order to be properly and correctly extracted. The area to be hot seal is as wide as around 5 mm along the rim of the circular shape of the filter paper.

Figure 8:
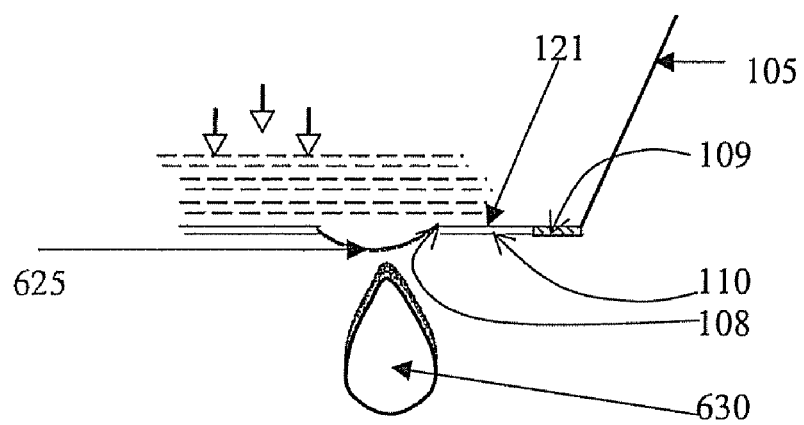
FIG. 8 is a vertical sectional blow-up view of a pressure point of the filter paper.

Each hole 108 of the invention represents about 28.26 mm2. Although the size of the hole/cutting area 108 can be varied, this size is preferred to create a natural water droplet size. The accumulation of the water on the pressure point 625 (see FIG. 8) reaches its maximum size before it starts to drop down as a droplet having a diameter in a range of between about 3 mm to about 8 mm. This maximum droplet size does not change accordingly when the perforation size is enlarged. Therefore maintaining the maximum range of the droplet size will become the most effective way to control the drip down process in this type of filter brewer. This is feature distinguishes this disclosure from other inventions that have a bigger or too of a small perforation outlet arrangement. The holes or cutting areas 108 are arranged to be separated at least 3 mm apart. This is important to create an individual droplet 630 (see again, FIG. 6) without interference from another droplet 630 which is positioned too close, in order to maintain a standard dropping rate. As gravity draws down the liquid from top to bottom, all of the holes or cutting areas 108 will experience a homogenous downward force from the liquid and will release the liquid at about the same rate. In other words, downward effect of the liquid upon the hole/holes 108 due to the gravity force (GF) is consistent and is spread evenly to each and every hole 108. The major benefit of this design is that it creates an independent and uniform droplet size. As learned from trials, the more standard the dropping rate the more precise its function as a time controlling mechanism. Also, more areas available for outputting the liquid as driven by the gravity force, accommodate a faster brewing rate.

Figure 6:
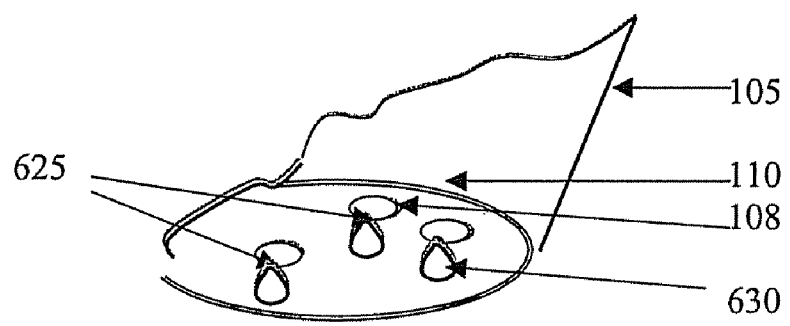
FIG. 6 is a perspective view showing the bottom of the coffee brewer with a Multiple Holes Cut Arrangement.
Figure 7:
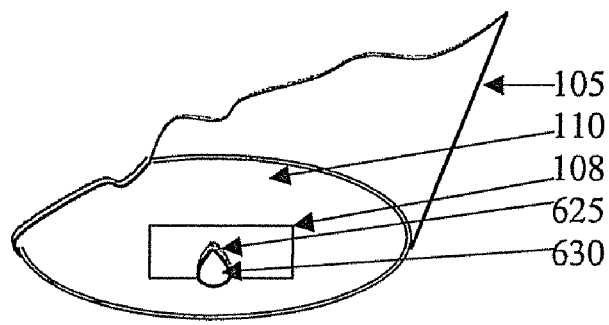
FIG. 7 is a perspective view showing the bottom of the coffee brewer with One Single Cut Arrangement.

As best seen in the FIG. 6 and FIG. 7, a pressure point 625 is developed on each and every opening/cutting area 108 when the hot water is poured in the filter cup 10. The gravity force GF pushes down the hot water which in its naturally forms an arch shape that has a lowest point referred to as the pressure point 625 on the filter paper 121. There are a plurality of pressure points 625 in FIG. 6, while the embodiment of FIG. 7 has only one. Although bigger in cutting size, pressure point 625 in FIG. 7 results in unstable and unpredictable droplets 630. On the other hand, the pressure point in FIG. 6 which resulted from multiple holes 108 is more predictable and, as set forth in Table 1, proved to be more stable.

Figure 3:
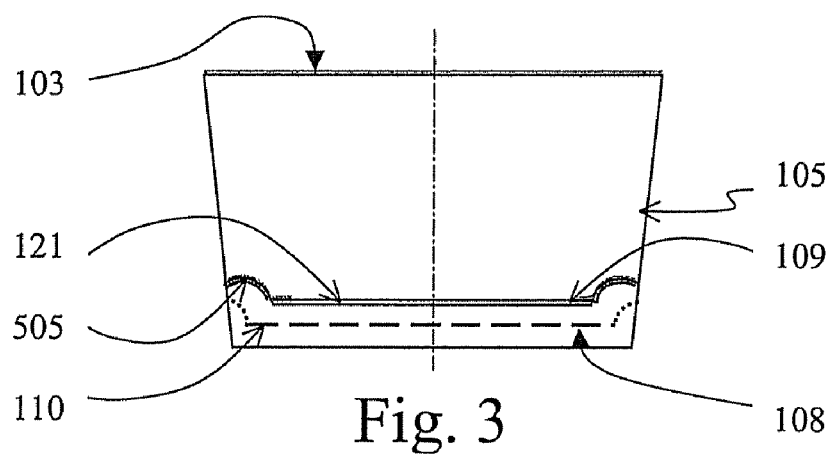
FIG. 3 is a vertical sectional view of the coffee brewer.
Figure 4:
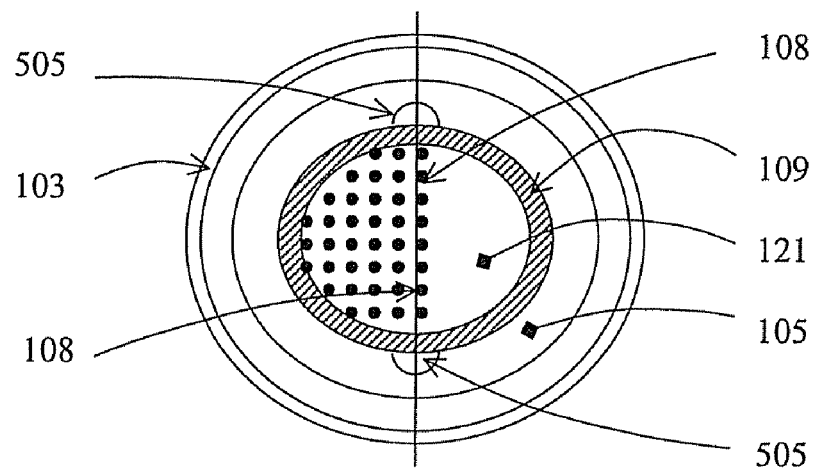
FIG. 4 is a top view of the coffee brewer.

The heat seal area 109 (FIG. 3 and FIG. 4) is applied at about a 5 mm width circling along an outer edge of the filter paper 121 onto the cup's bottom 110. The 5 mm heat seal width provides some stretching flexibility to form a better pressure point 625 (FIG. 8) during the drip-down process. The hot seal is possible because the commercial filter paper 121 contains Poly Ethylene (PE) on one side. When subjected to heat, the PE material melts and becomes part of the cup assembly.

Figure 5A:
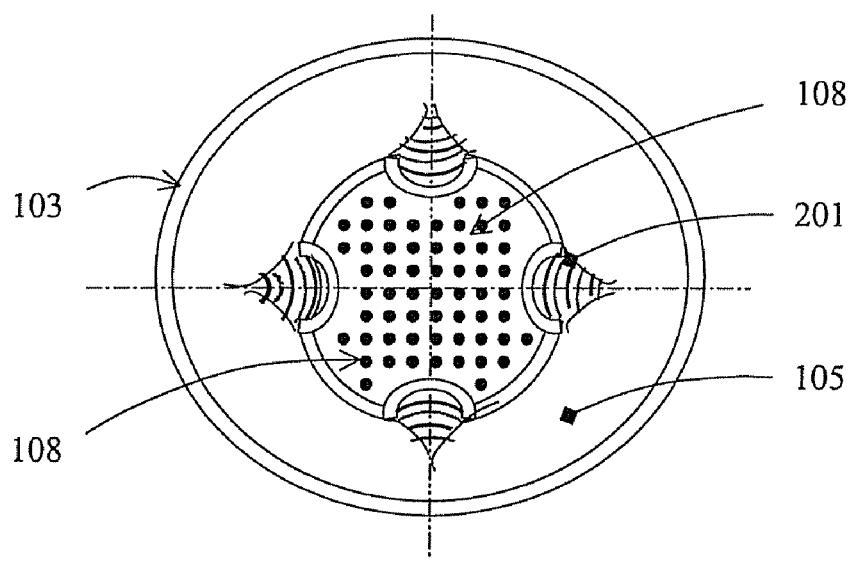
FIG. 5a is a bottom view of the coffee brewer.

Furthermore, to ensure a resistant-free flow of the liquid from top filter cup 10 to the bottom of the reservoir cup, a hot steam escaping route is provided. The filter cup 10 provides four (4) hot steam escaping vents 201 (FIG. 1 and FIG. 5a) on a lower part of the outer sidewall 105. The accumulated hot steam (hot steam build-up, or HSBU) has been a problem in brewing devices that are telescopingly assembled. The hot steam has become trapped in the lower liquid receiving cup has resulted in a slower extraction process. Throughout trials using a perfectly fitting telescoping assembly with no gap between the two cups, the trapped hot steam tended to accumulate into a massive force pushing upward and thus delaying the drip down process. This indicates that the gravity force is countered by the upward pressure of the hot steam and effects downward flow of the liquid. Therefore, hot steam release (HSR) enables the liquid to flow from top to bottom in a resistant-free manner. The invention has four concave shaped vents 201 that curve inwardly as deep as about 6 mm. The vents are as wide as about 1 cm and tapered upwardly as high as about 2.5 cm. Thus the vent 201 functions to avoid pressure build-up which can prolong the brewing time during the brewing process in the reservoir mug. When the filer cup 10 is disposed on a coffee mug these vents 201 allow hot steam that is accumulated in the reservoir cup to escap (FIG. 1). The number of petal shape corners can be maximized or minimized accordingly to the desired output of hot steam released (HSR) rate. When viewed from the bottom (FIG. 5a), the filter cup 10 can have the appearance of a flower with four petals.

The filter cup 10 uses the least filter paper 121 amongst any other similar product and is especially most efficient when compared to a tea bag for brewing tea beverage. In trials for brewing a tea beverage, this embodiment had a six (6) holes arrangement resulting in about two minutes brewing time, which is the same as that recommended in most tea bag brewing methods. For comparison, most tea bag requires 13,140 mm2 (with a length of 146 mm and width 90 mm) of filter paper while the described embodiment needs only 4183 mm2 (3.14×36.5 mm×36.5 mm) filter paper. This is 300% more efficient than most tea bag assemblies. Furthermore, in pursuing even more efficiency with highly precision machinery, it is possible to apply an individual hole sealing system. That is, filter paper may be applied to the bottom of the filter cup 10 in discrete areas corresponding only to an individual hole 108, and not extending over several holes 108. For example, each individual hole 108 with a diameter of 5 mm needs only one circular filter paper with diameter of 7 mm to be entirely covered. With this fabricating method, one can save up to 75% of current use (4183.3 mm2) and it is almost 1400% (13140 mm2 divided by 923 mm2) more efficient than most of the tea bag requirements in using filter paper. It is because its requirement of filter paper 121 can be adjusted accordingly to the number of cutting areas/holes 108 and brewing time limit requirement. A six (6) holes arrangement needs only 922 mm2 of filter paper that can be tracked from the following calculation: 7 mm2 filter paper to be sealed into 6 cutting areas/holes that would equal to 3.14×7 mm×7 mm=154 mm2×6 holes=923 mm2. Thus, with more flexible arrangements of the number of holes in order to accomplish a certain extraction need, the filter cup 10 is not wasting any unnecessary filter paper 121 like other brewing methods.

When telescopically engaged into the mouth of the reservoir cup or mug 11 which has an inner diameter in a range between about 7.2 cm to about 7.5 cm in diameter, the filter cup 10 will fit snuggly on the reservoir cup 11 without any holder. See, e.g., FIG. 1. For snugly sitting on top of a mug 11 having an inner diameter of about 7.6 cm to 8 cm, the filter cup 10 uses one or more attachable thin (about 3 mm thick×2.5 cm×2 cm) rectangular shape polystyrene sheets 610 (FIG. 2) on a bottom part of the outer side of the cup. The number of thin polystyrene sheets 610 can be used from one sheet to more than one according to the reservoir's cup 10 top opening width. The thin polystyrene sheet 610 can be pre-attached on the filter cup 10 during fabrication or it can be provided with double-sided-tape and attached by user whenever needed. The telescopic engagement of the embodiment is the most practical way to hold the cup receptacle firmly with the reservoir cup and thus provide a unique coffee or tea disposable brewer "On the Go" for portable use.

Figure 9:
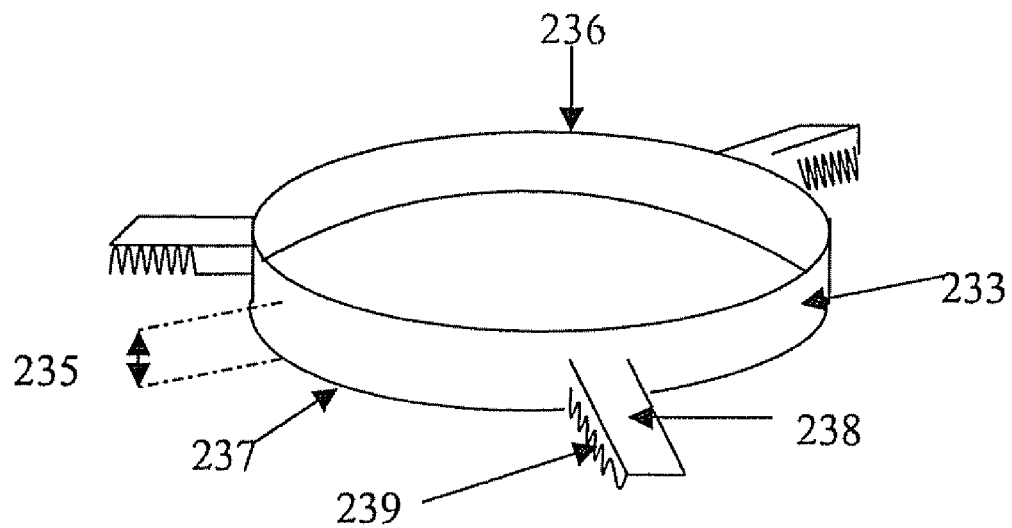
FIG. 9 is a perspective view of a ring support with three legs.
Figure 10:
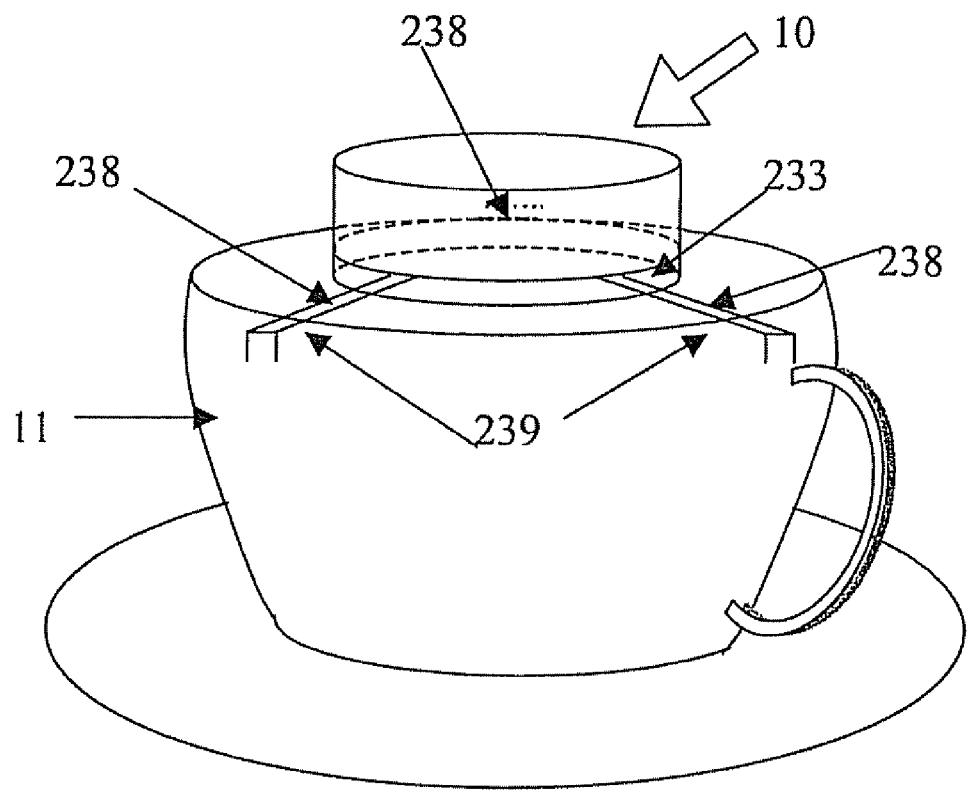
FIG. 10 is a perspective view of the filter cup on the supporting ring with three legs on top of a reservoir cup.

In another embodiment, the filter cup 10 may be mounted upon the cup 11 by a sit-on-ring 233 (FIG. 9 and FIG. 10) which is rounded in shape and has three supporting jagged legs 238 that each has a length of about 3.5 cm. Each of the supporting legs 238 is positioned at about one third of the ring's circumference. Each of the supporting legs 238 has a predetermine jagged part or ridge on a base 239 which is positioned to lock the filter cup 10 onto the larger top opening of the reservoir cup during the brewing process. The material being used for this supporting sit-on-ring 233 can range from sturdy plastic, paper base, wooden, bamboo, to a composite of various metal substances. The supporting ring 233 has a width 235 of about 1 cm which is tapered outwardly and which further has a top diameter 236 of about 7.5 cm and a bottom diameter 237 of about 7.3 cm.

In an alternative embodiment, the filter cup 10 is constructed to include, but is not limited to, material such as plastic and or polymeric, where the filter paper is configured to be peeled-off by pulling a semi circle 505 (FIG. 3-4) and discarding after each brewing cycle, thus allowing reuse of the cup 10 and hence preserving natural resources. The durability of the cup 10 can be enhanced when the cup 10 is made from, but is not limited to, material such as Poly Ethylene and or Poly Styrene or the combination thereof having a well know durability. With using these materials, the economic value of the cup will become very insignificant due to its capability to be used over and over again. In this embodiment, the only part that is discarded throughout the brewing cycle is the filter paper 121, and this is easy to be recycled. Thus, a clean environment is promoted through recycling only the part that is important to the brewing process (the filter 121) and allowing the supporting material (the cup assembly 10) to be used again and again. The hot seal of filter paper 121 onto the paper, polystyrene, or polyethylene cup is easily accomplished. A simple tool, such as solder, that is inexpensive and considered as an average household tool can be modified into a food grade (stainless steel) heating tip and used to seal the filter paper 121 onto the bottom 110 of the filter cup 10. Another alternative is to use a same shape and size of HVS paper or protection material commonly used in ironing to prevent the conventional solder from directly touching the filter paper 121. The filter paper is sealable because it contains Poly Ethylene on one of its sides. When applied to heat, the Poly Ethylene melts and attaches to the bottom of the cup and becomes part of the cup. As one brewing is done, the cup is reusable. All that is required is to properly wash and rinse the cup 10. The filter paper is been cut in a circular shape with two predetermined semi circles 505 on each of its poles (FIGS. 3-4) that are used to ease the peeling off process of the filter paper 121 after washing. It is easier to peel off the filter paper 121 when it is wet. After drying, a new filter paper is ready to be sealed onto the cup which creates another reusable new brewing device.

A standard coated paper cup, unless punctured, is encapsulated by a thin layer of Polyethylene substances to prevent any non-food grade material contained in the paper itself from contaminating the beverage contained into the cup. Therefore, in one alternative, especially for the coated paper cup 10, the punched or perforated bottom wall 110 can be recoated with water proof and heat resistant material such as polyethylene including, but not limited to, any kind of food grade wax, resin, organic or synthetic polymer, modified or unmodified sugar base coatable substances. The method of recoating includes but is not limited to brush, spray, and or immersion.

A further alternative to avoid a recoating process after puncturing the perforation 108 on the paper cup's base 110 is to change the paper cup's base 110 material to material including, but not limited to, polystyrene, biodegradable substances such as modified and or unmodified organic fibers and/or pulp and or starch, and/or polyethylene. During fabrication, the cup's base 110, made of polystyrene and or biodegradable substances and or polyethylene, is fed into the paper cup forming machine to be integrated into a new combination cup that has a paper coated wall 105 and polyethylene and/or biodegradable substances and or polystyrene bottom base 110. With this combination, the need to coat the perforation 108 is eliminated because the material being used is food grade. One more benefit is that the new combination cup reduces the need to punch the perforation 108 during fabrication. This is because the base 110, made with material such as polyethylene and or polystyrene, is formed in a mold that has a predetermined number of perforations.

Figure 5B:
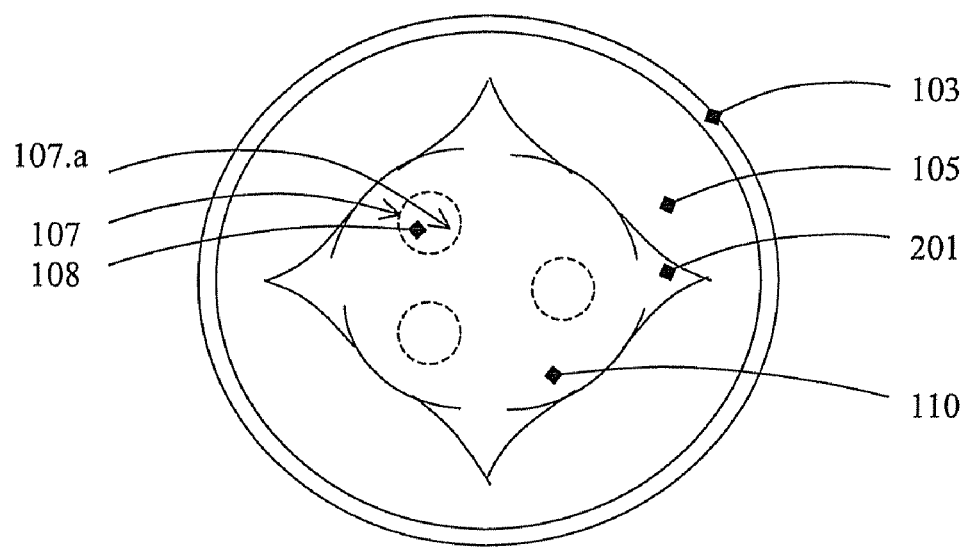
FIG. 5b is another bottom view of the coffee brewer.

Another alternative for making the cup's perforation 108 very flexible so as to be used in any type of extraction, is to form a maximum number of half-perforations 107 (FIG. 5*b*) allowed on the bottom of the cup's base 110. The perforation is formed into a half cut 107 with a small part 107*a* (about one fifth of the total base area) bulging out from the filter cup's base 110 to allow easy pull-off or peel-off when necessary. The half cut 107 is structured with many small-cuts-and-gaps along the outer edge of the perforation but is not punctured loose from the filter cup's base 110. Although some small leaking may appear from the un-peeled perforation, this method allows a user to custom peel-off any number of perforations he/she desires in order to perform his/her specific brewing need.

Figure 5C:
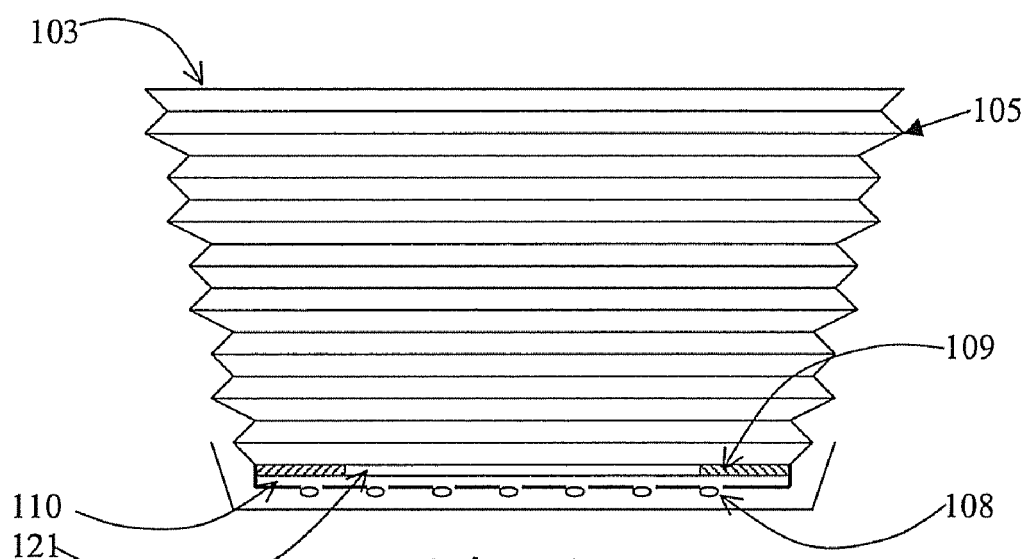
FIG. 5c is a perspective view of the coffee brewer in a full height position on an accordion structure.
Figure 5D:
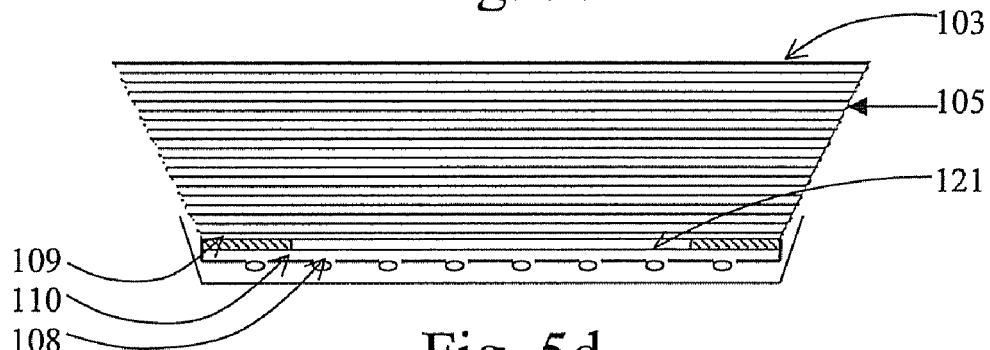
FIG. 5d is a perspective view of the coffee brewer in a flattened position on an accordion structure.

Further still alternatively, to save rack space on the retailer shelf and to provide a single pack of filter cup+coffee/tea+sugar+creamer into one single sachet, the filter cup 10 may be formed into an accordion like structure. The accordion shape or structure (best seen on FIG. 5*c* and FIG. 5*d*) of the cup can be formed during fabrication by using a specific molding treatment, and/or heat treatment, and/or pressure forming, or a combination thereof, in part of the filter cup's wall 105. The accordion shape or structure of the filter cup 10 can allow the cup to shorten or flatten (FIG. 5*d*) and thus can be fitted into a single serving pack. When the pack is opened, one can easily pull the flattened cup into a regular height (FIG. 5*c*) filter cup without altering the cup's main function as a filter apparatus.

In carrying out the operation of the invention, presumably the filter cup 10 has been assembled in the manner described and illustrated, and is supported on top of the mug 11. As seen in FIG. 1, a small pre-mix sachet that contains about 25 grams of ground coffee 612 and sugar and powder creamer is opened and poured onto the filter cup 10. When the hot water reaches a suitable degree, the hot water is then poured into the filter cup 10 and fills the cup almost to the top opening 103. The drip down process starts immediately but still provides enough time for a user to stir the mixture. A back and forth stirring movement of about 30 seconds to one minute is required when the hot water is fully filled in the filter cup 10. A proper stirring movement is crucial to break the shield effect of the fat layer created when in contact with the hot water. When the stirring process is done, the user only needs to wait until the mixed beverage has dripped down entirely onto the coffee mug. Furthermore, the filter paper 121 has trapped all the unextractable ingredients on the assembly of the filter cup 10. The beverage brewed in the filter cup 10 seeps through the filter paper, drips down the other side thereof into the mug. Once the water level is low and the drip down process is considered slow on the filter cup 10, the filter cup 10 can be easily pulled out and discarded. Instantly, the coffee beverage can then be consumed.

It is emphasized that the filter cup 10 can accommodate a reasonable volume (160 ml) of hot water required for brewing one serving of coffee or tea beverage (which usually only requires about 150 ml) on one single pouring. Moreover, the filter cup 10 is also designed to work with a larger cup 11 that may require at most two simple pourings. There is no need to pour a small volume and then wait and then repeatedly do the same thing until the beverage is ready to consume, like some existing brewing methods that use filter elements.

It is also emphasized that the number of the holes/cutting areas 108 on the bottom base 110 of the filter cup 10 can be varied and customized to result in a drip time in a range of about 1 minute to 13 minutes or longer depending on the specific need of brewing ingredient and time. The size of the hole/cutting area can be also modified into larger or smaller sizes to satisfy a specific brewing requirement. The shape of the opening or cutting area can be differentiated into many forms (such as company logo; characters; company's Icon or the like) so as to enhance the aesthetic appearance of the cutting area.

The specifics of the invention described herein will be understood as an illustrative and exemplary embodiments. Numerous modifications and alterations are within the competency for a person skilled in the art to employ the shown embodiment utilizing functionally equivalent components to those shown and described, without departing from the scope of the invention. For example, the shape and volume of the cup receptacle can be varied. Furthermore, the appearance of the hot steam escaping vent and the cup receptacle can also be varied to most any diameter desired. The scope of the invention, however, encompasses larger versions of the apparatus adapted for making more than one cup of coffee at the time. In addition, the scope of the invention includes use of non-disposable materials. All such modifications are intended to be included within the scope of the invention as defined by the appended claims.

When the coffee brewer shown and described is adapted for preparing an individual serving of coffee or tea or the like, the filter cup 10 may be approximately 4.7 cm high and have an open upper surface approximately 8.5 cm in diameter and a lower partially open bottom of about 7.3 cm in diameter.

What is claimed is:

1. A beverage brewer device, adapted to discharge fresh extractable ingredients to a liquid receiving container there below, the device comprising:

a brewing cup having an open top and having a liquid pervious bottom, adapted for holding a quantity of an infusible material for a certain time limit to allow a stirring action before dispensing the brewed beverage therefrom into the liquid receiving container;

at least one sheet of filter element sealed along a perimeter of a bottom base of the brewing cup by a non-toxic meltable substance and thereby sealed unto the bottom base of the brewing cup;

a plurality of perforations formed in the bottom base of the brewing cup wherein each of the perforations has an area of at least about 25 millimeters square and wherein the perforations are separated from each other by at least about 2 millimeters;

at least one concave shape vent disposed on a lower part of an outer wall of the brewing cup and configured to allow escape of steam from the liquid receiving container during brewing; and a sit-on-ring configured to support the brewing cup on the liquid receiving container, said sit-on-ring comprising:

a tapered frustoconical shaped annular ring; and a plurality of supporting legs extending generally radially from said annular shaped ring, said legs each including at least one ridge feature configured to receive a rim of the liquid receiving container and to removably fix the sit-on-ring to the liquid receiving container.

2. The device as set forth in claim 1, wherein said brewing cup is fabricated from a material selected from a group consisting of polystyrene compounds, plastic, organic Bio-degradable polymer, non organic polymer, modified and unmodified organic fibers and or pulp and or starch, and coated paperboard.

3. The device as set forth in claim 1, wherein said brewing cup is fabricated from a combination of material selected from a group consisting of polystyrene compounds, plastic organic and or non organic Bio-degradable polymer, and or modified and or unmodified organic fibers and or pulp and or starch, and coated paperboard.

4. The device as set forth in claim 1, wherein said lower wall of said brewing cup is circular in cross section.

5. The device as set forth in claim 1, wherein said perforations are arranged at least three millimeters apart from one to another.

6. The device as set forth in claim 1, wherein each of said perforations has a cross-sectional area of about 28 millimeters square.

7. The device as set forth in claim 1, wherein said filter element is heat-sealed over an area as wide as about five millimeters circling along the outer edge unto the bottom base of said brewing cup.

8. The device as set forth in claim 1, wherein said at least one concave shaped vents comprises a plurality of vents spaced equally unto four sides of the brewing cup.

9. The device as set forth in claim 1, wherein said at least one concave shaped vent comprises an inwardly concaved corner as deep as six millimeters, and as wide as one centimeter that tapers upwardly as high as two and half centimeters of said brewing cup outer wall.

10. The device as set forth in claim 1, further comprising a polystyrene sheet attachable unto said bottom part of the outer side of the brewing cup, wherein the polystyrene sheet delimits the vent.

11. The device as set forth in claim 10 wherein said polystyrene sheet is rectangular in shape with an approximate three millimeter thickness, a length of about two and half centimeters, and a width of about two centimeters.

12. The device as set forth in claim 1 wherein said supporting sit-on-ring has an upper diameter of about 7.5 cm and a bottom diameter of about 7.3 cm.

13. The device as set forth in claim 1, wherein the perforations are generally circular in shape.

14. The device as set forth in claim 1, wherein the device comprises two of said concave shaped vents, and wherein the vents are disposed generally opposite from one another proximate to the perimeter of the bottom base.

15. The device as set forth in claim 1, wherein the perforations are separated from one another by about three millimeters.

16. The device as set forth in claim 1, wherein the legs of the sit-on-ring extend radially beyond the perimeter of the brewing cup.

17. The device set forth in claim 1, wherein the legs have an upper surface and an opposing lower surface and wherein the ridge feature comprises a plurality of ridges disposed on the lower surface extending in a first direction away from the upper surface and in a second direction generally concentric to the annular ring.

18. The device as set forth in claim 1, wherein the ridges are configures to receive the rim of the liquid receiving container so as to prevent horizontal movement of the sit-on-ring relative to the liquid receiving container and so as to permit vertical movement of the sit-on-ring relative to the liquid receiving container.

19. The device set forth in claim 1, wherein said plurality of supporting legs comprises at least three supporting legs.

* * * * *